United States Patent
Ma

(12) 
(10) Patent No.: US 6,191,940 B1
(45) Date of Patent: Feb. 20, 2001

(54) FOLDABLE AND PORTABLE PLANAR DISPLAY DEVICE

(76) Inventor: His-Kuang Ma, 4F, No. 48, Sec. 2, Chung Cherng Road, Taipei (TW)

(*) Notice: Under 35 U.S.C. 154(b), the term of this patent shall be extended for 0 days.

(21) Appl. No.: 09/225,515

(22) Filed: Jan. 6, 1999

(51) Int. Cl.[7] ..................................................... G06F 1/16
(52) U.S. Cl. ........................ 361/681; 361/682; 248/917; 248/918; 312/223.1
(58) Field of Search .................................. 361/681, 682; 248/917–925; 345/169, 905; 312/223.1, 223.6

(56) References Cited

U.S. PATENT DOCUMENTS

| | | | | |
|---|---|---|---|---|
| 4,939,514 | * | 7/1990 | Miyazaki | 361/398 |
| 5,608,863 | * | 3/1997 | Ishizawa et al. | 361/682 |
| 5,995,085 | * | 11/1999 | Bowen | 361/683 |
| 6,031,714 | * | 2/2000 | Ma | 361/681 |

* cited by examiner

Primary Examiner—Leo P. Picard
Assistant Examiner—Hung Van Duong
(74) Attorney, Agent, or Firm—Dougherty & Troxell

(57) ABSTRACT

A foldable and portable planar display device includes a display, an intermediate support, and two side supports. The display includes a display screen and a display pivotal connecting means at a lower end thereof. The intermediate support includes an intermediate support pivotal connecting means that is pivotally connected to the display pivotal connecting means such that the intermediate support can pivotally turn with respect to the display and be positioned at a determined angle. The intermediate support is closable to rest against a rear side of the display. Each side support includes a side support pivotal connecting means pivotally connected to the display pivotal connecting means such that the side support can turn with respect to the display and be positioned at a determined angle. The side supports are closable to rest against the rear side of the display. By means of the intermediate support and the two side supports, the display can be supported on a planar surface in a firm and stable manner.

5 Claims, 2 Drawing Sheets

FOLDABLE AND PORTABLE PLANAR DISPLAY DEVICE

BACKGROUND OF THE INVENTION (a) Field of the Invention

The present invention relates to a display device, more particularly to a planar display device that can be folded to facilitate carrying.

(b) Description of the Prior Art

In general, each computer is equipped with a monitor or display. In other words, each display is provided for a single device such as a notebook computer or a DVD, etc. Such a one-to-one configuration is sometimes a waste of resources in certain situations. Besides, the size of the display may be unduly small due to the size of the equipment it is used in conjunction with.

In recent years, there has been developed a kind of display that can be independently installed for external connection to other devices. However, since a display as such is integrally designed and is fixedly installed to a certain extent, it is convenient to carry.

SUMMARY OF THE INVENTION

A primary object of the present invention is to provide a foldable and portable planar display device that can be connected externally to other devices and that can be folded in a compact size to facilitate carrying.

BRIEF DESCRIPTION OF THE DRAWINGS

The foregoing and other features and advantages of the present invention will be more clearly understood from the following detailed description and the accompanying drawings, in which.

DETAILED DESCRIPTION OF THE PREFERRED EMBODIMENT

Figure 1:
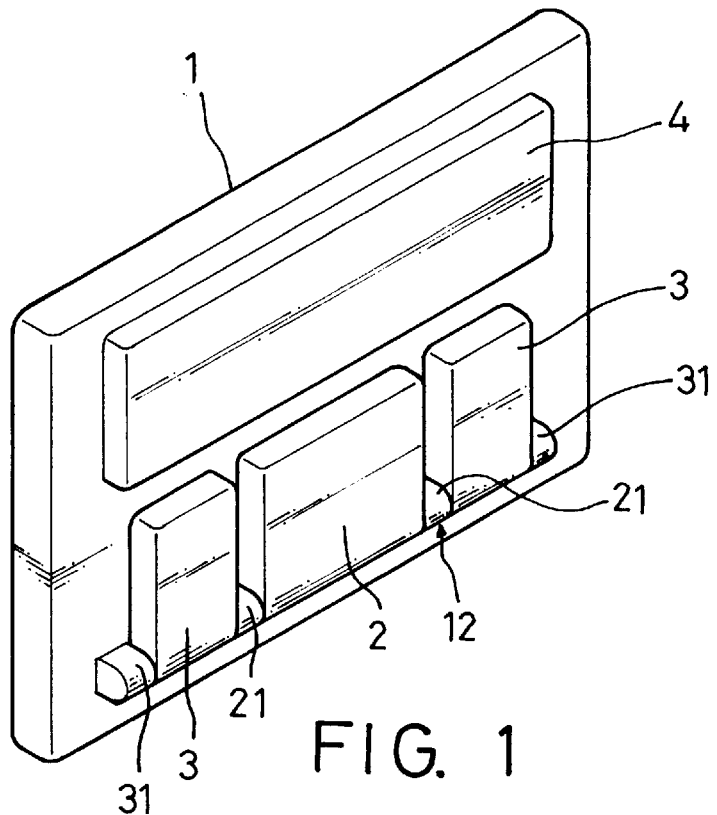
FIG. 1 is a perspective schematic view of the display device of the present invention in a closed state.
Figure 2:
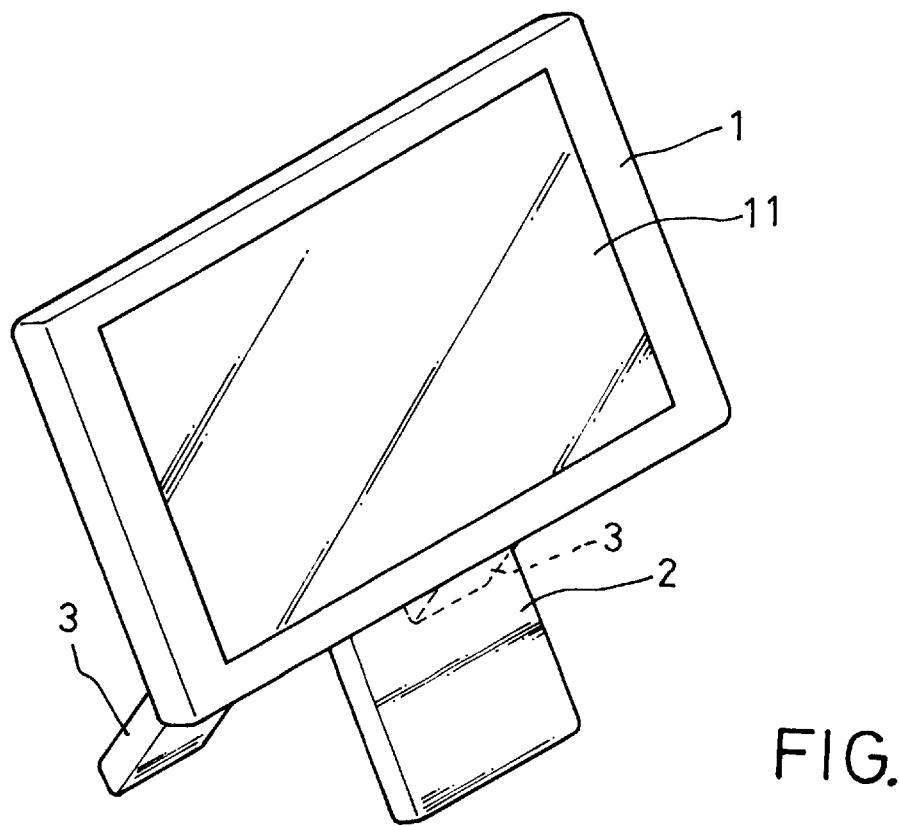
FIG. 2 is a perspective schematic view of the display device of the present invention in a state of use.
Figure 3:
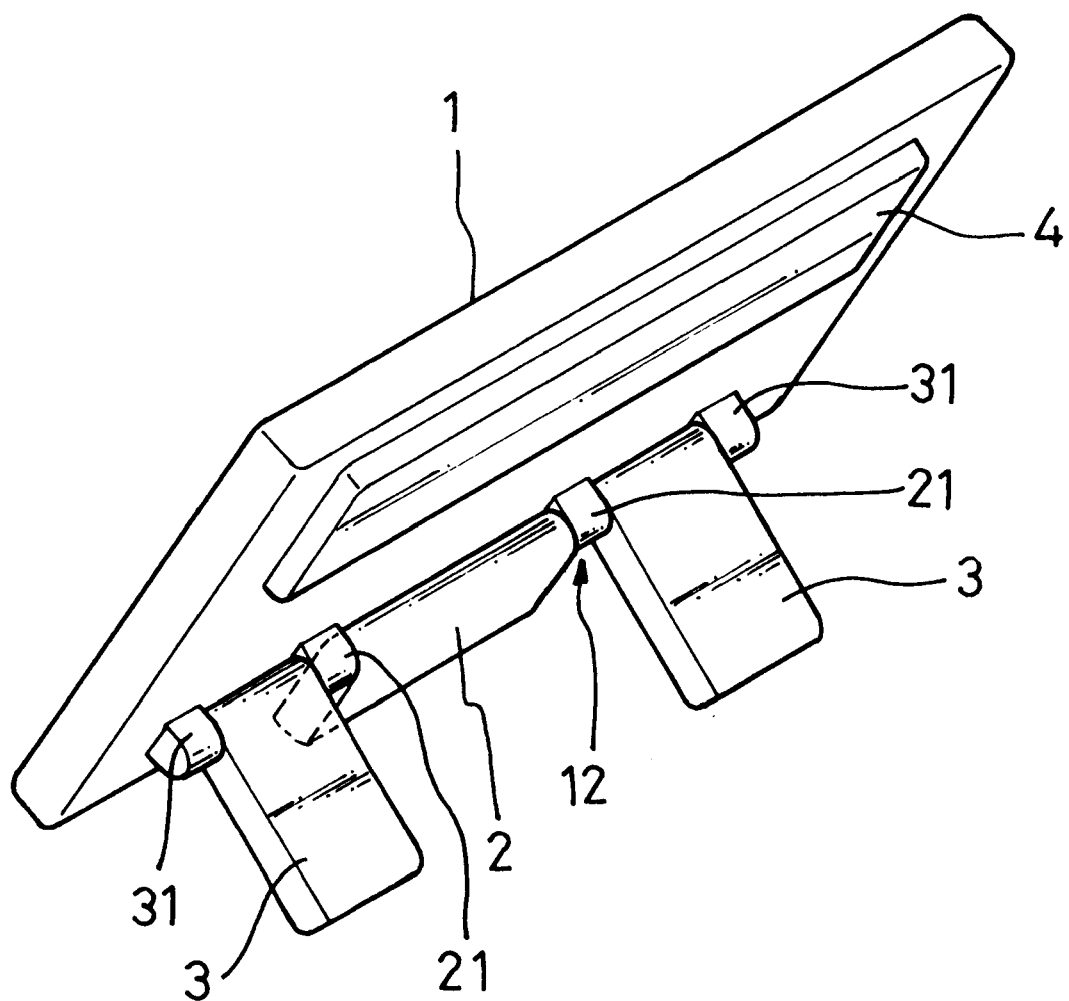
FIG. 3 is a rear perspective schematic view of FIG. 2.

With reference to FIGS. 1 to 3, the present invention is shown to comprise a display 1, an intermediate support 2, two side supports 3, and a rear box 4.

The structure of the display 1 is known and includes a display screen 11, and a display pivotal connecting means 12 at a lower end for pivotal connection between the intermediate support 2 and the side supports 3 to allow them to turn or be stayed within a determined angle.

The intermediate support 2 serves as a supporting leg and is provided with an intermediate support connecting means 21 relative to the display pivotal connecting means 12 whereby it can turn within a determined angle or be positioned with respect to the display 1. The intermediate support connecting means 21 may be a known stagnatable hinge but is limited thereto.

The side supports 3 are provided on both sides of the intermediate support 2 respectively. Each side support 3 has a side support pivotal connecting means 31 connected to the display pivotal connecting means 12 so that it can turn with respect thereto and be positioned within a determined angle. However, the angle of turning of the side supports 3 is different from that of the intermediate support 2 so that the display 1 can be supported at three points when the side supports 3 and the intermediate support 2 are turned in an extended state.

The rear box 4 has an interior accommodating therein a device such as a conventional circuit board, television, computer, network or HDD so that images can be displayed via the above-mentioned display screen 11.

In order that the intermediate support 2 will not be laid idle, it can be configured to be a hollow box structure adapted to contain circuit board or DVD devices, and have a laterally oriented slot adapted for input/output, and the images are displayed via the display screen 11.

The two side supports 3 may also be configured to be hollow boxes adapted to contain therein circuit boards or speakers to permit emission of sounds.

In addition, the display 1 may be connected externally to other devices such as computers or DVD devices. As the circuitry of this kind is known in the art, a discussion thereof is herein omitted.

Referring to FIG. 1, when the present invention is in a closed state, the intermediate support 2 and the side supports 3 are closed to rest against a rear side of the display 1 so as to facilitate carrying.

In use, referring to FIGS. 2 and 3, the intermediate support 2 and the side supports 3 are turned in different directions to support the display 1 at three points. By connecting the display 1 to an external device, images are output via the display screen 11.

As mentioned above, since the intermediate support 2 and the rear box 4 may contain devices such as computers, DVD, HDD, etc., the present invention itself can output images. If speakers are provided inside the side supports, the present invention can serve as a computer or a DVD, or connected externally to a device for output of images. It can be appreciated that the display of the present invention is foldable to reduce its overall size so that it is convenient to carry.

Although the present invention has been illustrated and described with reference to the preferred embodiment thereof, it should be understood that it is in no way limited to the details of such embodiment but is capable of numerous modifications within the scope of the appended claims.

What is claimed is:

1. A foldable and portable planar display device, comprising:

a display having a display screen and a display pivotal connection at a lower end thereof;

an inter mediate support including an intermediate support pivotal connection that is pivotally connected to said display pivotal connection such that said intermediate support is pivotally movable with respect to said display so as to be positioned at a first predetermined angle relative to the display, said intermediate support being closable to rest against a rear side of said display;

two side supports each having a side support pivotal connection pivotally connected to said display pivotal connection such that said side supports are pivotally movable with respect to said display so as to be positioned at a second pre-determined angle relative to the display, said side supports being closable to rest against said rear side of said display;

whereby said first pre-determined angle of said intermediate support is different from the second pre-determined angle of said side supports whereby said display is supported at three points to enable said display to stand firmly and stably on a surface.

2. The foldable and portable planar display device as defined in claim 1, wherein said display is provided with a connector adapted to connect said display externally to a computer or DVD.

3. The foldable and portable planar display device as defined in claim 1, wherein said intermediate support is configured to be a box structure adapted to contain devices such as a DVD or circuit board and have a circuitry connected to said display.

4. The foldable and portable planar display device as defined in claim 1, wherein said side supports are configured to be box structures adapted to contain devices such as circuit boards or speakers.

5. The foldable and portable planar display device as defined in claim 1, further comprising a rear box provided above said display pivotal connection, said rear box accommodating therein a respective one of a circuit board, computer, television, network or HDD.

* * * * *